No. 785,457. PATENTED MAR. 21, 1905.
F. R. WARWICK.
TAIL HOLDING ATTACHMENT FOR HARNESS.
APPLICATION FILED APR. 30, 1904.
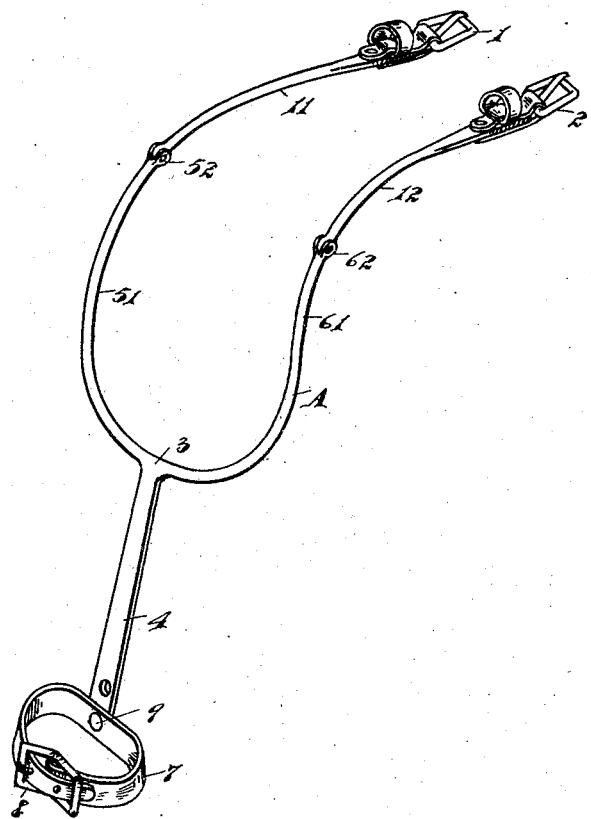
WITNESSES
INVENTOR
Frank R. Warwick
By Parker & Burton Attorneys.

No. 785,457. Patented March 21, 1905.

UNITED STATES PATENT OFFICE.

FRANK R. WARWICK, OF LAPEER, MICHIGAN.

TAIL-HOLDING ATTACHMENT FOR HARNESS.

SPECIFICATION forming part of Letters Patent No. 785,457, dated March 21, 1905.

Application filed April 30, 1904. Serial No. 205,643.

*To all whom it may concern:*

Be it known that I, FRANK R. WARWICK, a citizen of the United States, residing at Lapeer, county of Lapeer, State of Michigan, have invented a certain new and useful Improvement in Tail-Holding Attachments for Harness; and I declare the following to be a full, clear, and exact description of the invention, such as will enable others skilled in the art to which it pertains to make and use the same, reference being had to the accompanying drawing, which forms a part of this specification.

This invention relates to tail-holding attachments for harnesses, and has for its object an attachment to be affixed to the crupper or to be buckled to the back-strap and take the place of the crupper and which has projecting from it an arm that extends or projects underneath the tail of the horse and is provided with a strap by means of which the tail is secured and held so that the horse cannot lift it over the lines.

In the drawing the figure is a perspective showing the attachment as a unitary structure.

A indicates a bow member, preferably of metal, having the shape of an ordinary crupper and provided at the outer extremities of the bowed part with buckles 1 and 2, by means of which it is secured to the back-strap of a harness. From the middle of the bow or bend 3 an arm 4 projects and at it lower terminal has secured to it a strap 7, provided with a buckle 8, the strap being secured to the arm 4 by a rivet 9. Both branches of the bowed part are curved to conform to the curvature of the rump of the animal, so that when the middle part 3 lies close under the root of the animal's tail the two branches engage closely against the body throughout their entire extent.

Not only has a departure from the straight form of construction been followed, as just explained, but it has also been found advantageous to have each branch 51 and 61 of the bowed member hinged or jointed at about the middle point of each, as at 52 and 62. This permits some vertical movement of the horse's tail. When this takes place, that part of the attachment and both the main arm 4 and the branches 51 and 61 rise slightly, while the upper arms 11 and 12 of each branch member remain practically stationary on the rump of the animal. This, while permitting this unobjectionable degree of vertical movement, is highly efficient and, in fact, succeeds entirely in preventing lateral motion or switching of the tail.

What I claim is—

1. A tail-holder consisting of a crupper of rigid material bent to conform to the curvature of the animal over the rump, provided with means for attaching it to the back-strap of a harness each branch of the bow being hinged, a projection depending from the bow portion, having at its free end means for attaching the tail to said projection, substantially as described.

2. A tail-holder, consisting of a crupper provided with means for attaching it to the back-strap of a harness, the bow part thereof being hinged and curving downwardly, a projection depending from the bow of the crupper, provided at its free end with means for holding the tail to said projection, substantially as described.

In testimony whereof I sign this specification in the presence of two witnesses.

FRANK R. WARWICK.

Witnesses:
   O. H. WATTLES,
   MARGARET WATTLES,